FIG. I

United States Patent Office 3,647,906
Patented Mar. 7, 1972

3,647,906
ALPHA-OLEFIN PRODUCTION
Francis F. Farley, Oakland, Calif., assignor to Shell Oil Company, New York, N.Y.
Filed May 11, 1970, Ser. No. 36,241
Int. Cl. C07c *3/62, 3/10*
U.S. Cl. 260—683 D                                    5 Claims

ABSTRACT OF THE DISCLOSURE

Ethylene is converted to linear $\alpha$-olefins of a selected range of carbon atoms by (1) oligomerizing ethylene to linear $\alpha$-olefins, (2) separating the linear $\alpha$-olefins into a lower $\alpha$-olefin fraction of the selected range of carbon atoms and a higher $\alpha$-olefin fraction, (3) recovering the lower $\alpha$-olefin fraction as product, (4) isomerizing the higher $\alpha$-olefin fraction to internal olefins, (5) disproportionating the internal olefins with excess ethylene to produce additional lower $\alpha$-olefins which are recycled to step 2 for separation. By a preferred modification of the process ethylene is converted to an $\alpha$-olefin product mixture of a controlled molecular weight range and free of lower oligomers, e.g., dimers, trimers, etc.

BACKGROUND OF THE INVENTION

Linear $\alpha$-olefins are compounds of established utility in a variety of applications. Such olefins are converted to corresponding alcohols by conventional "Oxo" processes or sulfuric acid catalyzed hydration. The $C_{14}$–$C_{20}$ alcohols thus produced are ethoxylated with ethylene oxide in the presence of a basic catalyst, e.g., sodium hydroxide, to form conventional detergents and lower molecular alcohols are esterified with polyhydric acids, e.g., phthalic acid, to form plasticizers for polyvinyl chloride. Alternatively, $\alpha$-olefins, particularly $C_{14}$–$C_{20}$, are converted to $\alpha$-olefin sulfonates, e.g., as by treatment with sulfur trioxide, which are useful as biodegradable detergents.

It is known that ethylene can be oligomerized to higher molecular weight $\alpha$-olefins in the presence of certain organometallic catalysts, e.g., Ziegler-type catalysts such as aluminum trialkyls. Although such catalytic ethylene oligomerization processes have been known for many years, they have not been widely utilized in commerce. One major reason for this lack of commercial utility is the difficulty of directing the catalytic oligomerization to produce a product fraction of controlled and specific molecular weight range.

SUMMARY OF THE INVENTION

It has been found that linear $\alpha$-olefins of a selected range of carbon atoms can be produced from ethylene in an improved, cyclic-type, integrated process which comprises the steps of (1) oligomerizing ethylene to a mixture of linear $\alpha$-olefins with an ethylene oligomerization catalyst (2) separating the linear $\alpha$-olefins into a lower $\alpha$-olefin fraction of the selected range of carbon atoms and a higher $\alpha$-olefin fraction (3) recovering the lower $\alpha$-olefin fraction as product (4) isomerizing the higher $\alpha$-olefin fraction to internal olefins and (5) reacting the internal olefins with excess ethylene to produce additional $\alpha$-olefins which are recycled to step (2). In a preferred modification of process, the lower $\alpha$-olefin fraction is separated into a light $\alpha$-olefin fraction of dimers, trimers, etc. and an intermediate $\alpha$-olefin fraction of molecular weight intermediate between the light $\alpha$-olefins and the higher $\alpha$-olefins. The intermediate $\alpha$-olefin fraction is recovered as product and the light $\alpha$-olefin fraction is isomerized and disproportionated in the presence of a combined isomerization/disproportionation catalyst to produce additional internal olefins for recycle to step (5).

By the process of the invention, ethylene is converted to linear $\alpha$-olefins of any controlled and specific molecular weight range.

Figure 1:
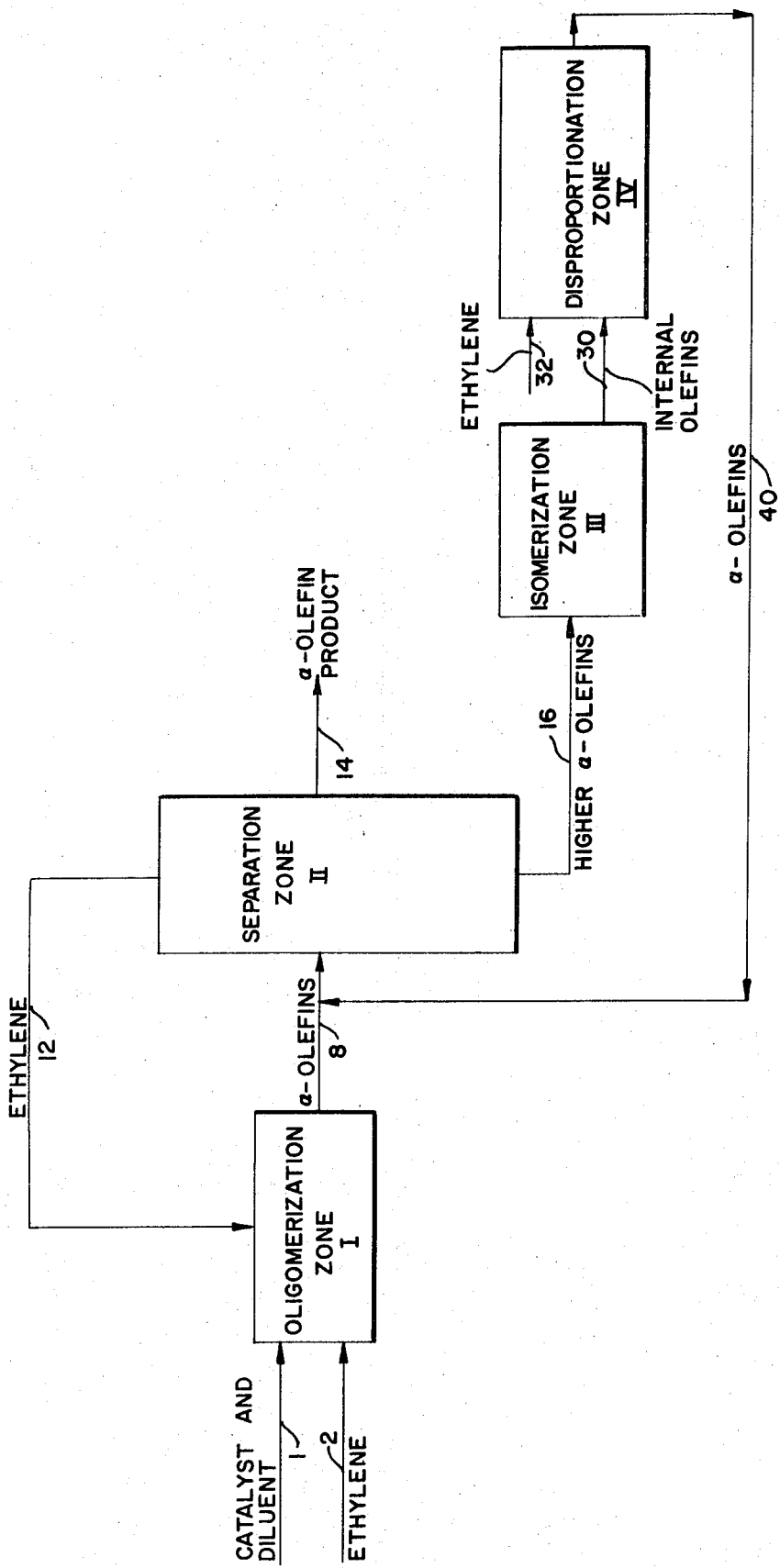
FIG. 1 of the drawing is a schematic flow diagram of one modification of the process wherein an $\alpha$-olefin product mixture having 4 carbon atoms up to any desired number of carbon atoms is produced.

For convenience and clarity, apparatus not essential to a complete understanding of the invention such as means for providing heat, refrigeration, stirring, pressure control, cooling, separations and the like have been omitted from the drawing. The selection and location of such means will be apparent to one skilled in this art.

With reference to FIG. 1, I designates an oligomerization zone, II a separation zone, III an isomerization zone and IV a disproportionation zone. The oligomerization catalyst and reaction diluent are charged through line 1 to the oligomerization zone I, maintained at desired reaction conditions of temperature and pressure. Ethylene is introduced through line 2. The resulting product mixture comprising $C_4$–$C_{40}$ $\alpha$-olefins is removed through line 8 to the separation zone II wherein unreacted ethylene is recycled through line 12. In the separation zone II, $C_4$–$C_{40}$ $\alpha$-olefin products are separated into a lower $\alpha$-olefin fraction, e.g., $C_4$–$C_{18}$, and a higher $\alpha$-olefin fraction, e.g., $C_{18}$+. The lower $\alpha$-olefin fraction is recovered as product through line 14. The higher $\alpha$-olefins are passed through line 16 to the isomerization zone III wherein they are isomerized to internal olefins. The internal olefins are passed to the disproportionation zone wherein they are reacted with excess ethylene to produce additional linear $\alpha$-olefins. The required ethylene is provided from line 32. The linear $\alpha$-olefins are recycled through line 40 to the separation zone II for separation.

Figure 2:
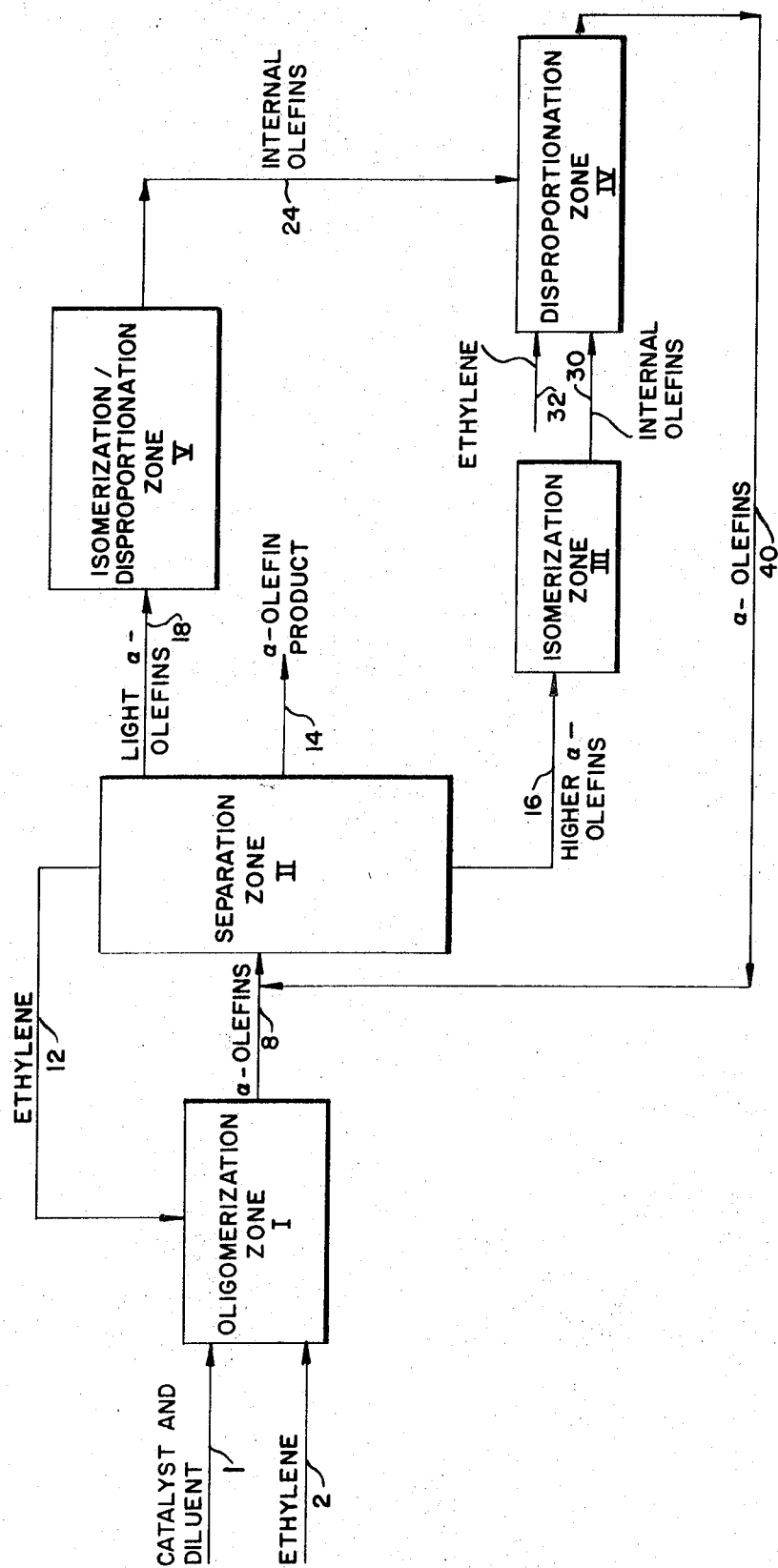
FIG. 2 of the drawing is a schematic flow diagram of another modification of the process wherein an $\alpha$-olefin product mixture free of lower oligomers, e.g., dimers, trimers, etc., is produced.

The modification depicted in FIG. 2 may be summarized as follows: In the oligomerization zone I, ethylene is oligomerized to a $C_4$–$C_{40}$ $\alpha$-olefin product mixture which is removed through line 8 to the separation zone II. In the separation zone, ethylene is separated and recycled through line 12 to the oligomerization zone, and the $C_4$–$C_{40}$ $\alpha$-olefins are separated into a light $\alpha$-olefin fraction, e.g., dimers, trimers, etc., an intermediate $\alpha$-olefin fraction, e.g., $C_{10}$–$C_{20}$, and a higher $\alpha$-olefin fraction, e.g., $C_{20}$+. The intermediate $\alpha$-olefins are recovered as products through line 14. The higher $\alpha$-olefins are passed through line 16 to the isomerization zone III wherein they are isomerized to internal olefins. The internal olefins are then passed via line 30 to a first disproportionation zone IV wherein they are reacted with excess ethylene, introduced through line 32, to produce additional linear $\alpha$-olefins, which are recycled through line 40 to the separation zone II. The light $\alpha$-olefin fraction is passed through line 18 to an isomerization/disproportionation zone V wherein they are converted to ethylene and additional intermediate and higher molecular weight range internal olefins. The internal olefins and ethylene are passed through line 24 to the disproportionation zone IV wherein the internal olefins are reacted with excess ethylene to produce additional $\alpha$-olefins. The ethylene may also be recycled to the oligomerization zone if desired.

DESCRIPTION OF PREFERRED EMBODIMENTS

Oligomerization zone.—In the oligomerization zone I, ethylene is converted to a mixture of linear $\alpha$-olefins in the presence of any variety of ethylene oligomerization catalysts. Although the distribution of the linear α-olefin mixture will depend in part upon the particular ethylene oligomerization catalyst employed, the mixture of linear α-olefins is generally of from 4 to 40 carbon atoms, but preferably of from 4 to 30 carbon atoms.

One suitable class of ethylene oligomerization catalysts are Ziegler-type catalysts, i.e., compounds of metals such as alkali metals, e.g., lithium, sodium, potassium; alkaline earth metals such as beryllium and magnesium; and Group III metals such as aluminum, gallium, and indium. Suitable Ziegler-type catalysts and ethylene oligomerization reaction conditions are those described in U.S. 2,699,457, issued Jan. 11, 1955, to Ziegler et al., U.S. 3,310,600 issued Mar. 21, 1967, to Ziegler et al.; and U.S. 3,478,124, issued Nov. 11, 1969, to Fernald et al., and U.S. 3,482,000, issued Dec. 2, 1969, to Fernald et al. Preferred Ziegler-type oligomerization catalysts are aluminum trialkyls.

Another class of suitable ethylene oligomerization catalysts are nickel chelates of certain phosphorus-containing bidentate ligands, including those described in copending application, Ser. No. 874,377, of Keim et al., common assignee, filed Nov. 5, 1969 and copending application, Ser. No. 874,058 of Bauer et al., common assignee, filed Nov. 4, 1969. Ser. No. 874,377 discloses the oligomerization of ethylene with nickel chelates of bidentate ligands having a tertiary organophosphorus moiety and a carboxymethyl or carboxyethyl group attached directly to the phosphorus atom of the organophosphorus moiety (e.g., a nickel chelate of diphenylcarboxymethylphosphine). Ser. No. 874,058 discloses the oligomerization of ethylene with nickel chelates of bidentate ligands having a tertiary organophosphorus moiety and a functional group selected from hydroxymethyl, mercaptomethyl, hydrocarboyl and hydrocarbyloxycarbonyl substituted on a carbon atom attached directly to the phosphorus atom of the organophosphorus moiety (e.g., a nickel chelate of diphenylhydroxymethylphosphine).

Separation zone.—The α-olefin product mixture from the oligomerization zone is passed to the separation zone II. The separation zone may comprise a suitable fractionation unit or similar conventional separation apparatus. Any unreacted ethylene and diluent are recycled to the oligomerization zone. The α-olefins are separated into a lower α-olefin fraction of a selected range of carbon atoms and a higher α-olefin fraction. The range of carbon atoms of the lower α-olefin fraction can be any suitable range desired. Useful ranges are from about 4 carbon-numbers up to 20 carbon-numbers, e.g. $C_4$–$C_8$, $C_4$–$C_{14}$, $C_4$–$C_{20}$. The lower α-olefin fraction may contain α-olefins having the same carbon-number as the lowest α-olefin in the higher α-olefin fraction, but preferably contains only α-olefins of carbon-numbers lower than the carbon-number of the lowest α-olefin in the higher α-olefin fraction. The higher α-olefin fraction may include α-olefins of the same carbon-number as the highest α-olefin in the lower α-olefin fraction up to the highest α-olefin produced in the oligomerization reaction, but generally not higher than $C_{40}$. Preferably, however, the higher α-olefin fraction contains only α-olefins of carbon-numbers higher than the carbon number of the highest α-olefin in the lower α-olefin fraction.

In the modification of the process wherein an α-olefin product mixture free of light oligomers, e.g., dimers, trimers, tetramers, etc., is desired, the lower α-olefin fraction is further separated into a light α-olefin fraction and an intermediate α-olefin fraction. The light α-olefin fraction may include from $C_4$ up to $C_{12}$, e.g., $C_4$–$C_6$, $C_4$–$C_8$, $C_4$–$C_{10}$, etc. In this modification, the intermediate α-olefin fraction is removed as product and the light α-olefin fraction is converted to additional intermediate α-olefins hereinafter described.

Isomerization zone.—In the isomerization zone the higher α-olefins are converted to internal olefins by double-bond isomerization. The isomerization can be conducted by any more or less conventional procedure, either liquid or gas phase, with a wide variety of isomerization catalysts. The α-olefins are generally isomerized to at least 70% internal olefins, but preferably to at least 90% internal olefins. Preferred catalysts are those which have little or no polymerization or cracking activity. Some examples of suitable isomerization catalysts include supported phosphoric acid, bauxite, alumina supported cobalt oxide or iron oxide or manganese oxide, and the like. Suitable catalysts can be selected from among those available in the art, such as the double bond isomerization catalysts tabulated by H. N. Dunning in "Review of Olefin Isomerization," Ind. and Eng. Chem., 45, 551 (1953).

Disproportionation zone.—In the disproportionation zone, higher internal olefins are reacted with ethylene to produce α-olefins. By way of illustration, a higher olefin such as 15-triacontene and ethylene are disproportionated into two molecules of 1-hexadecene. Similarly, 4-tetracosene and ethylene are disproportionated into 1-pentene and 1-heneicosene. Both of these reactions can be depicted by the following general equation wherein R and R' represent linear alkyl groups:

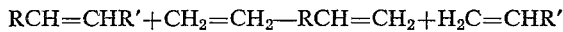

$$RCH=CHR' + CH_2=CH_2 \rightarrow RCH=CH_2 + H_2C=CHR'$$

The disproportionation reaction is conducted by contacting the higher internal olefins and ethylene in the presence of a disproportionation catalyst. It should be appreciated that two molecules of the internal olefin may in some instances disproportionate to produce other higher and lower internal olefinic products during the reaction of the internal olefins with ethylene. To distinguish the two possible reactions, it is convenient to call the disproportionation of the internal olefins with ethylene "ethenolysis."

In order to effect the ethenolysis reaction and to insure that the disproportionation of two internal olefins does not proceed to any significant extent, e.g., 5% or less, it is essential to provide an excess of ethylene in the first disproportionation (ethenolysis) zone. Generally, molar ratios of ethylene to internal olefins of at least 8:1 are satisfactory, although molar ratios of ethylene to internal olefins of at least 15:1 are preferred.

In general, any olefin disproportionation catalyst is suitably employed in the ethenolysis reaction. A description of suitable catalysts is given in an extensive review article by G. C. Bailey in "Catalysis Reviews" 3(1), 37–60 (1969). Preferred olefin disproportionation catalysts are those which do not promote the polymerization of ethylene. Particularly, preferred olefin disproportionation catalysts are rhenium oxides supported on alumina, especially those which have been pre-treated with alkali or alkaline earth metal compounds to reduce double bond isomerization.

The ethenolysis reaction is conducted by contacting in liquid phase, ethylene, the internal olefins, the catalyst and, if desired, a reaction diluent which is liquid at reaction temperature and pressure. Illustrative of suitable diluents are hydrocarbons free from aliphatic unsaturation such as saturated acyclic or alicyclic alkanes of from 6 to 12 carbon atoms, e.g., hexane, isooctane, decane and cyclohexane; and monoaromatic hydrocarbons of from 6 to 12 carbon atoms, e.g., benzene and toluene. In most instances, added diluent is used in amounts up to about 20 moles of diluent per mole of olefinic reactants. The ethenolysis reaction is conducted in an inert reaction environment so that the reaction conditions are substantially anhydrous and substantially oxygen-free.

The precise method of establishing ethylene/olefin/catalyst contact is not critical. In one modification, the entire amounts of reaction components are charged to an autoclave, and the reaction mixture is maintained with agitation at reaction temperature and pressure for the desired reaction period. Another modification comprises passing, in a continuous manner, the olefinic reactants in liquid phase solution in the reaction diluent through a reaction zone in which the catalyst is maintained. By any modification, the ethenolysis process is generally conducted at moderate temperatures and pressures. Suitable reaction temperatures vary from 10° C. to about 250° C., but preferably from 20° C. to about 150° C. The precise pressure is not critical, so long as the reaction mixture is maintained substantially in a non-gaseous phase. Typical pressures vary from about 1 atmosphere to about 80 atmospheres.

It should be appreciated that the olefin products from the disproportionation zone contain both even and odd number of carbon atoms, whereas only even carbon number olefins are produced in the ethylene oligomerization zone.

Disproportionation/isomerization zone.—In the modification of the process wherein an α-olefin product mixture free of light α-olefins, e.g., dimers, trimers, etc., is desired, an isomerization/disproportionation zone is provided for converting the light α-olefins into intermediate and higher internal olefins in the presence of a combined isomerization/disproportionation catalyst. The resulting internal olefins are then passed to the disproportionation (ethenolysis) zone and reacted with ethylene to produce additional α-olefins of molecular weight higher than the light α-olefins. By way of illustration, in the isomerization/disproportionation zone, two molecules of 1-hexene are disproportionated to produce 5-decene and ethylene; the 5-decene is isomerized to 4-decene, 3-decene, and 2-decene; two molecules of 2-decene are disproportionated to produce 2-butene and 8-hexadecene; the 8-hexadecene is isomerized to 7-hexadecene, . . ., 2-hexadecene. Reaction of 2-hexadecene with ethylene in the disproportionation (ethenolysis) zone produces 1-pentadecene, an α-olefin in the useful $C_{14}$–$C_{20}$ range.

Catalysts suitably used for simultaneous isomerization and disproportionation are disclosed in Netherlands patent application 6804601 of Phillips Petroleum, Netherlands patent application 6818762 of British Petroleum and Netherlands patent application 6900368 of Imperial Chemicals Industries. Preferred isomerization/disproportionation catalysts are $MoO_3$/$CoO$/$MgO$-on-alumina, and $Re_2O_7$/$K_2O$-on-alumina.

The simultaneous isomerization and disproportionation reactions are conducted by any more or less conventional procedure employed for isomerization or disproportionation of olefins. Although the reaction conditions depend in part upon the particular catalyst employed, generally suitable temperatures vary from about 25° C. to 300° C. and suitable pressures vary from about 1 atmosphere to 80 atmospheres. The olefins to be isomerized and disproportionated are contacted for sufficient time to produce a reasonable amount of internal olefins, e.g., 10–25% wt., of the required chain length for the production of α-olefins of the carbon atoms desired. Contact times can vary from 30 minutes to 100 hours.

EXAMPLE

Oligomerization

An oligomerization catalyst is prepared by contacting 1.71 millimoles of bis-1,5-cyclooctadienenickel(0) and 1.71 millimoles of diphenylcarboxymethylphosphine in 90 ml. of benzene at 25° C. The resulting benzene catalyst solution is then contacted with ethylene maintained at a constant pressure of 550 p.s.i.g. in a stirred autoclave for 4 hours at 75° C. Ethylene oligomers are produced at a rate of 76.7 grams per gram-atom of nickel per hour The distribution of oligomers is as follows: 13.8% wt. $C_4$, 14.5% wt. $C_6$, 13.5% wt. $C_8$, 11.8% wt. $C_{10}$, 10.0% wt. $C_{12}$, 8.1% wt. $C_{14}$, 6.5% wt. $C_{16}$, 5.1% wt. $C_{18}$, 4.0% wt. $C_{20}$ and 12.5% wt. $C_{22}+$.

In a similar manner a mixture of linear α-olefin oligomers can be prepared by ethylene oligomerization with a Ziegler-type catalyst such as triethylaluminum.

Isomerization of higher olefin fraction, followed by ethenolysis

A sample of $C_{22}+$ oligomers obtained after separation of the $C_4$–$C_{20}$ fraction is isomerized to about 90% internal olefins in the presence of magnesium oxide granules (30–50 mesh) in liquid phase at 200° C. The isomerized $C_{22}+$ oligomers are then contacted with a 10 molar excess of ethylene in the presence of a $Re_2O_7$-on-alumina disproportionation catalyst (20% wt. $Re_2O_7$, activated at 570° C. for 1 hour) in a stirred autoclave at 140° C. for 1 hour. The distribution of products obtained is as follows: 0.5% wt. $C_3$, 7.2% wt. $C_4$, 0.8% wt. $C_5$, 8.8% wt. $C_6$, 1.2% wt. $C_7$, 9.2% wt. $C_8$, 1.5% wt. $C_9$, 10.0% wt. $C_{10}$, 1.7% wt. $C_{11}$, 9.8% wt. $C_{12}$, 2.2% wt. $C_{13}$, 9.1% wt. $C_{14}$, 2.4% wt. $C_{15}$, 9.0% wt. $C_{16}$, 2.5% wt. $C_{17}$, 8.8% wt. $C_{18}$, 2.6% wt. $C_{19}$, 8.6% wt. $C_{20}$, and balance $C_{22}+$.

I claim as my invention:

1. A process of converting ethylene to linear α-olefins of a selected range of carbon atoms by:
    (1) oligomerizing ethylene in a first reaction zone to a mixture of linear α-olefins in the presence of an oligomerization catalyst
    (2) separating in a separation zone the mixture of α-olefins into a lower α-olefin fraction of the selected range of carbon atoms and a higher α-olefin fraction
    (3) recovering the lower α-olefin fraction as product
    (4) isomerizing in a second reaction zone the higher α-olefin fraction to higher internal olefins
    (5) disproportionating in a third reaction zone the higher internal olefins with ethylene to a second mixture of α-olefins in the presence of a disproportionation catalyst, and
    (6) recycling the second mixture of α-olefins to the separation zone.

2. The process of claim 1 wherein the lower α-olefin fraction is $C_4$–$C_{20}$.

3. The process of claim 1 wherein:
    (a) the lower α-olefin fraction is further separated into a light α-olefin fraction and an intermediate α-olefin fraction,
    (b) the intermediate α-olefin fraction is recovered as product, and
    (c) the light α-olefin fraction is isomerized and disproportionated in a fourth reaction zone and then passed to the third reaction zone.

4. The process of claim 3 wherein the light α-olefin fraction is $C_4$–$C_{10}$.

5. The process of claim 4 wherein the lower α-olefin fraction is $C_4$–$C_{20}$.

References Cited

UNITED STATES PATENTS

| | | | |
|---|---|---|---|
| 3,457,320 | 7/1969 | Stapp et al. | 260—683 |
| 3,491,163 | 1/1970 | Kenton et al. | 260—683 |
| 3,526,676 | 9/1970 | Turner et al. | 260—683 |

PAUL M. COUGHLAN, JR., Primary Examiner

C. E. SPRESSER, JR., Assistant Examiner

U.S. Cl. X.R.

260—683.15 D, 683.2